(12) United States Patent
Kawasaki et al.

(10) Patent No.: US 7,875,329 B2
(45) Date of Patent: Jan. 25, 2011

(54) THERMOPLASTIC RESIN COMPOSITION AND DOUBLE GLAZED GLASS UNIT USING THE SAME

(75) Inventors: Tomohiro Kawasaki, Kanagawa (JP); Shigeru Yamauchi, Kanagawa (JP); Hidenori Uechi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 420 days.

(21) Appl. No.: 10/565,803

(22) PCT Filed: Feb. 3, 2005

(86) PCT No.: PCT/JP2005/001588

§ 371 (c)(1),
(2), (4) Date: Jan. 25, 2006

(87) PCT Pub. No.: WO2005/075552

PCT Pub. Date: Aug. 18, 2005

(65) Prior Publication Data

US 2007/0003717 A1  Jan. 4, 2007

(30) Foreign Application Priority Data

Feb. 6, 2004 (JP) ............................. 2004-030868
Jul. 1, 2004 (JP) ............................. 2004-195438

(51) Int. Cl.
*E06B 3/00* (2006.01)
(52) U.S. Cl. ..................... 428/34; 52/786.1; 52/786.13; 156/107; 156/109
(58) Field of Classification Search ................... 428/34; 52/786.1, 786.13; 156/107, 109
See application file for complete search history.

(56) References Cited

U.S. PATENT DOCUMENTS 4,607,074 A * 8/1986 Hazelton et al. ............ 524/425

(Continued)

FOREIGN PATENT DOCUMENTS

DE        199 50 535 A1    5/2000

(Continued)

OTHER PUBLICATIONS

Office Action dated Aug. 30, 2005 from the Japanese Patent Office in corresponding Japanese Application No. 2004-195438.

(Continued)

*Primary Examiner*—David R Sample
*Assistant Examiner*—Walter Moore
(74) *Attorney, Agent, or Firm*—Finnegan, Henderson, Farabow, Garrett & Dunner, L.L.P.

(57) ABSTRACT

A thermoplastic resin composition which is excellent in heat resistance, low in heat shrinkage and excellent in resistance to moisture vapor transmission, and is capable of improving the productivity of insulating glass units. The composition includes a thermoplastic resin (A) having a specific moisture vapor permeability; at least one kind of unvulcanized rubber (B) selected from the group consisting of a halide of a copolymer of para-methylstyrene and polyisobutylene and an ethylene propylene rubber; and a moisture absorbent (C). The weight ratio of the thermoplastic resin (A) to the unvulcanized rubber (B) is 85/15 to 15/85, and the content of the moisture absorbent (C) is 10 to 70 parts by weight to 100 parts by weight of the total of (A) and (B). The insulating glass unit uses the composition in at least a spacer.

8 Claims, 3 Drawing Sheets

U.S. PATENT DOCUMENTS

| | | | | |
|---|---|---|---|---|
| 4,622,249 A | * | 11/1986 | Bowser | 428/34 |
| 5,502,112 A | * | 3/1996 | Peacock | 525/240 |
| 5,851,609 A | * | 12/1998 | Baratuci et al. | 428/34 |
| 6,235,356 B1 | | 5/2001 | Shibuya et al. | |
| 6,491,992 B1 | | 12/2002 | Koizumi et al. | |

FOREIGN PATENT DOCUMENTS

| | | |
|---|---|---|
| JP | 09-077536 | 3/1997 |
| JP | 10-81548 | 3/1998 |
| JP | 10-110072 | 4/1998 |
| JP | 10-114551 | 5/1998 |
| JP | 10-114552 | 5/1998 |
| JP | 2000-119537 | 4/2000 |

OTHER PUBLICATIONS

Supplementary European Search Report dated Oct. 2, 2009.

* cited by examiner

THERMOPLASTIC RESIN COMPOSITION AND DOUBLE GLAZED GLASS UNIT USING THE SAME

TECHNICAL FIELD

The present invention relates to an insulating glass unit and a thermoplastic resin composition. In particular, the present invention relates to an insulating glass unit excellent in heat resistance, moldability, and dew point performance and having high productivity; and a thermoplastic resin composition to be used for the insulating glass unit.

BACKGROUND ART

Insulating glass units excellent in heat insulating properties have been recently attracting attention in the fields of construction and production of vehicles such as automobiles for the purpose of, for example, maintaining the temperature inside a room, a car, or the like.

Figure 5:
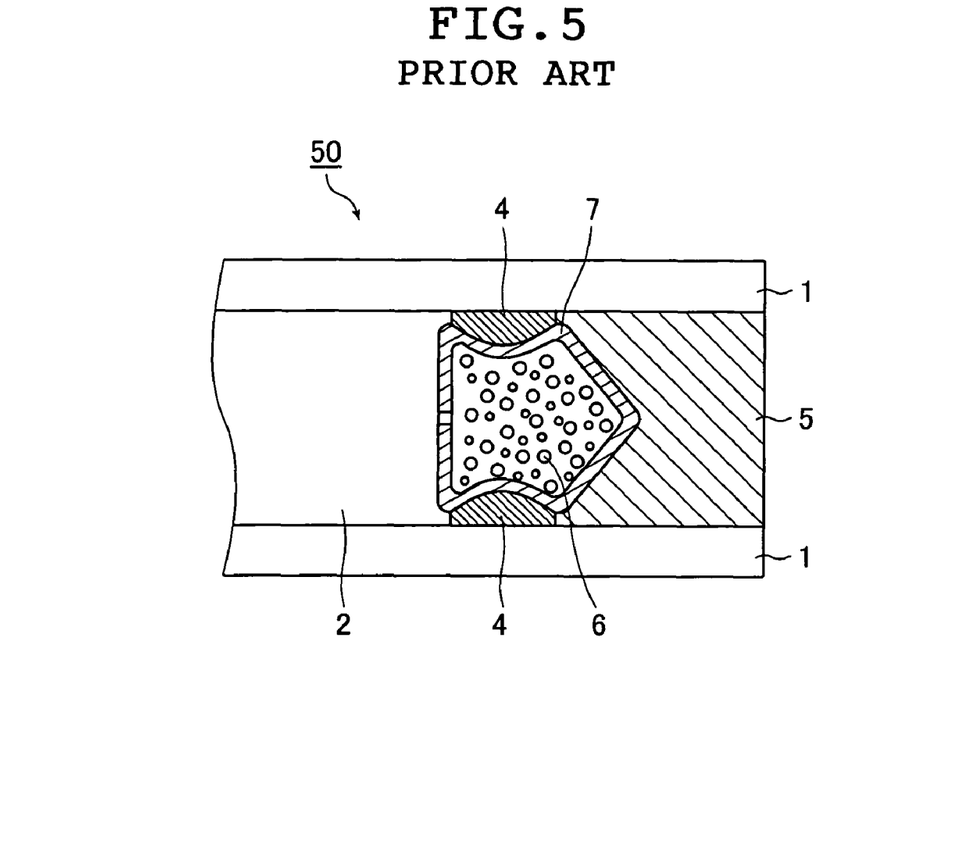
FIG. 5 is a schematic sectional view showing an example of the constitution of a conventional insulating glass unit.

FIG. 5 is a schematic sectional view showing an example of the constitution of such a (conventional) insulating glass unit.

A conventional insulating glass unit 50 shown in FIG. 5 generally has a structure in which at least two glass plates 1 are opposed to each other through a metal spacer 7 made of aluminum or the like; a hollow layer (air layer) 2 is formed between the glass plates 1; a primary seal (adhesive layer) 4 is interposed between the spacer 7 and each of the glass plates 1 to shield the air layer 2 from outside air; and a secondary seal (sealant) 5 such as a two-component, room-temperature curing type sealant typified by polysulfide or silicone sealant or butyl rubber hot melt is placed in an end gap surrounded by the spacer 7, the primary seals 4, and the opposing glass plates 1.

A method adopted for producing the insulating glass unit involves filling a hollow portion of the metal spacer (especially aluminum spacer) 7 having a hollow structure with a desiccant (moisture absorbent) 6 as the spacer to be used therefor; arranging the spacer 7 between the glass plates 1; adjusting the width between the glass plates 1 to a predetermined value; and casting the sealant 5. As described above, the production process is complicated, and an insulating glass unit using the room-temperature curing type sealant 5 involves a lot of time to cure the sealant, leading to incapability to ship it immediately after the production. In particular, in winter, the insulating glass unit must be placed in a heating chamber for curing the sealant. Accordingly, a technique for improving the productivity of insulating glass units through simplification of their production process and reduction of the curing time has been demanded.

For the purpose of satisfying the demand, an insulating glass unit using, as a spacer, a resin composition kneaded as required with a desiccant instead of the aluminum spacer has been proposed (see, for example, Patent Documents 1 to 3). An example of the resin composition includes a thermoplastic resin composition which contains a butyl rubber, a crystalline polyolefin, and an inorganic filler, and in which the ratio of the butyl rubber to the total of the butyl rubber and the crystalline polyolefin is 50 to 98 wt %; the ratio of the crystalline polyolefin to the total of the butyl rubber and the crystalline polyolefin is 2 to 50 wt %; and the ratio of the inorganic filler to 100 parts by weight of the total of the butyl rubber and the crystalline polyolefin is 200 parts by weight or less (see claim 6 of Patent Document 2).

There has also been proposed a thermoplastic elastomer composition which uses, as starting materials, a thermoplastic resin having a moisture vapor transmission rate of 100 g/(m²·24 h) or lower (30 µm in thickness) and a rubber having a moisture vapor transmission rate of 300 g/(m²·24 h) or lower (30 µm in thickness) when cross-linked; and which has, in a thermoplastic resin continuous phase, a disperse phase composed of a rubber composition at least part of which is dynamically cross-linked (see Patent Document 4).

Such thermoplastic resin composition and thermoplastic elastomer composition can be made into spacers and also serve as sealants. Therefore, an insulating glass unit which has a spacer and in which ends of opposing glass plates are sealed can be produced by casting the thermoplastic resin composition or thermoplastic elastomer composition at the ends of the opposing insulating glass members. Accordingly, the insulating glass unit production process using the thermoplastic resin composition or thermoplastic elastomer composition is easier than that using a metal spacer, so productivity can be improved to some extent.

Patent Document 1: JP 10-110072 A

Patent Document 2: JP 10-114551 A

Patent Document 3: JP 10-114552 A

Patent Document 4: JP 2000-119537 A

DISCLOSURE OF THE INVENTION

Problems to be Solved by the Invention

In the thermoplastic resin compositions described in Patent Documents 1 to 3, simplification of the production process and improvement of the productivity can be achieved to some extent, but heat resistance deteriorates when butyl rubber is used; and a strong shear force cannot be obtained when a thermoplastic resin is used as a continuous phase and a dynamically cross-linked rubber is used as a disperse phase.

In addition, those thermoplastic resin compositions have high heat shrinkage and shrinks when cooled after having been cast between glass plates. So, an air layer of an insulating glass unit is narrower than a desired width and hence moldability (dimensional stability) may often be degraded.

Meanwhile, simplification of the production process and improvement of the productivity can be achieved to some extent by using the thermoplastic elastomer composition described in Patent Document 4. However, since the composition is dynamically cross-linked, partial cross-linking of the composition takes place in the insulating glass production process, particularly in a molten state upon application of the composition to a glass plate, which may lead to increase of the viscosity and reduction of the production efficiency.

In the fields of construction, automobiles and the like, improvement in air tightness and heat insulating properties in a house, a car or other places has been strongly demanded, so an additional improvement in dew point performance, especially durability of insulating glass units has been desired.

The present invention has been made with a view to solving the above problems. Specifically, an object of the present invention is to provide a composition which is excellent in heat resistance; has low heat shrinkage; is excellent in resistance to moisture vapor transmission; and can improve the productivity of insulating glass units.

The inventors of the present invention also aim at providing an insulating glass unit using the above composition which can be easily produced; which has high productivity; and which is excellent in heat resistance, moldability, and dew point performance.

Means to Solve the Problems

The inventors of the present invention have made extensive studies to achieve the above objects. As a result, they have found that a thermoplastic resin composition containing a thermoplastic resin having specific physical properties, a specific unvulcanized rubber, and a moisture absorbent at a specific weight ratio is excellent in heat resistance, low in heat shrinkage, and low in moisture vapor permeability as an index of excellent resistance to moisture vapor transmission.

They have also found that the use of the composition containing the unvulcanized rubber can suppress a change in viscosity of the composition and improve the productivity of insulating glass units.

They have also found that a thermoplastic resin composition which is more excellent in moldability and maintains discharge property (fluidity) is obtained by incorporating an inorganic filler at a specific ratio.

They have also found that an insulating glass unit using a spacer made of the thermoplastic resin composition can be easily produced, has high productivity, and is excellent in heat resistance, moldability, and dew point performance.

The inventors have completed the present invention on the basis of those findings.

That is, the present invention provides the following (1) to (14).

(1) A thermoplastic resin composition, containing:
a thermoplastic resin (A) having a moisture vapor permeability of $1.0 \times 10^{-13}$ $cm^3 \cdot cm/(cm^2 \cdot sec \cdot Pa)$ or lower;
at least one kind of unvulcanized rubber (B) selected from the group consisting of a halogenated isoolefin/para-alkylstyrene copolymer and an ethylene propylene rubber; and a moisture absorbent (C), in which:
the weight ratio of the thermoplastic resin (A) to the unvulcanized rubber (B) is 85/15 to 15/85; and
the content of the moisture absorbent (C) is 10 to 70 parts by weight to 100 parts by weight of the total of the thermoplastic resin (A) and the unvulcanized rubber (B).

(2) A thermoplastic resin composition, containing:
a thermoplastic resin (A) having a moisture vapor permeability of $1.0 \times 10^{-13}$ $cm^3 \cdot cm/(cm^2 \cdot sec \cdot Pa)$ or lower;
at least one kind of unvulcanized rubber (B) selected from the group consisting of a halogenated isoolefin/para-alkylstyrene copolymer and an ethylene propylene rubber; and a moisture absorbent (C);
the thermoplastic resin composition being obtained by mixing them at the mixing ratios according to which
the weight ratio of the thermoplastic resin (A) to the unvulcanized rubber (B) is 85/15 to 15/85 and
the content of the moisture absorbent (C) is 10 to 70 parts by weight to 100 parts by weight of the total of the thermoplastic resin (A) and the unvulcanized rubber (B).

In each of (1) and (2), the halogenated isoolefin/para-alkylstyrene copolymer is preferably a halide of a copolymer of para-methylstyrene and polyisobutylene (X-IPMS), and is more preferably Br-IPMS.

In each of (1) and (2), various additives are preferably further compounded.

(3) The thermoplastic resin composition according to (1) or (2), in which the thermoplastic resin (A) is at least one selected from the group consisting of a low density polyethylene (LDPE) and a linear low density polyethylene (LLDPE).

(4) The thermoplastic resin composition according to any one of (1) to (3), which further contains an inorganic filler.

(5) The thermoplastic resin composition according to any one of (1) to (4), which has a moisture vapor permeability of $5.0 \times 10^{-13}$ $cm^3 \cdot cm/(cm^2 \cdot sec \cdot Pa)$ or lower.

(6) An insulating glass unit which includes a spacer made of the thermoplastic resin composition according to any one of (1) to (5).

(7) An insulating glass unit including a spacer which is made of the thermoplastic resin composition according to any one of (1) to (5) and which also serves as a sealant.

(8) An insulating glass unit including a spacer which is made of the thermoplastic resin composition according to any one of (1) to (5) and which also serves as a sealant, and adhesive layers which are arranged between the thermoplastic resin composition and glass.

(9) The insulating glass unit according to (6) or (8), which further includes a secondary seal.

(10) The insulating glass unit according to (6),
which includes two glass plates opposed to each other; and the spacer arranged between the two glass plates, and
in which an air layer is formed by the two glass plates and the spacer.

(11) The insulating glass unit according to (10), in which a gap formed by an outer peripheral surface of the spacer and inner surfaces of peripheral portions of the two glass plates is sealed with a secondary sealant.

(12) The insulating glass unit according to (7),
which includes two glass plates opposed to each other; and the spacer also serving as the sealant and arranged between the two glass plates, and
in which an air layer is formed by the two glass plates and the spacer also serving as the sealant, and the spacer maintains a distance between the two glass plates at a predetermined value and also serves as the sealant by sealing the air layer from outside air.

(13) The insulating glass unit according to (8),
which includes two glass plates opposed to each other; the spacer also serving as the sealant and arranged between the two glass plates; and the adhesive layers arranged between the glass plates and the spacer also serving as the sealant, and
in which an air layer is formed by the two glass plates, the spacer also serving as the sealant, and the adhesive layers; and
the spacer maintains a distance between the two glass plates at a predetermined value and also serves as the sealant by sealing the air layer from outside air.

(14) The insulating glass unit according to (13), in which a gap formed by an outer peripheral surface of the spacer also serving as the sealant, the adhesive layers, and inner surfaces of peripheral portions of the two glass plates is sealed with a secondary sealant.

EFFECTS OF THE INVENTION

The thermoplastic resin composition of the present invention is excellent in heat resistance, has low heat shrinkage, is excellent in resistance to moisture vapor transmission and is capable of improving the productivity of insulating glass units.

In addition, the insulating glass unit of the present invention can be easily produced, has high productivity, and is excellent in heat resistance, moldability, and dew point performance.

LEGEND 1 glass plate
2 air layer (hollow layer)
3 spacer
4 adhesive layer
5 secondary sealant
6 moisture absorbent
7 metal spacer
10, 12, 14, 16, 50 insulating glass unit
20 cup
22 water
24 sample sheet
26 sintered metal plate
28 fixing member
30 bolt
32 nut

BEST MODE FOR CARRYING OUT THE INVENTION

Hereinafter, the present invention will be described in detail.

The thermoplastic resin composition of the present invention (which may hereinafter be referred to as the "composition of the present invention") is a thermoplastic resin composition which contains a thermoplastic resin (A) having a moisture vapor permeability of $1.0 \times 10^{-13}$ cm$^3$·cm/(cm$^2$·sec·Pa) or lower; at least one kind of unvulcanized rubber (B) selected from the group consisting of a halogenated isoolefin/para-alkylstyrene copolymer and an ethylene propylene rubber; and a moisture absorbent (C), and in which the weight ratio of the thermoplastic resin composition (A) to the unvulcanized rubber (B) (the thermoplastic resin (A)/the unvulcanized rubber (B)) is 85/15 to 15/85; and the content of the moisture absorbent (C) is 10 to 70 parts by weight to 100 parts by weight of the total of the thermoplastic resin (A) and the unvulcanized rubber (B).

An insulating glass unit which is high in productivity and is excellent in heat resistance, moldability, and dew point performance is obtained by using the composition of the present invention for the spacer or the like of an insulating glass unit.

The thermoplastic resin (A) having a moisture vapor permeability of $1.0 \times 10^{-13}$ cm$^3$·cm/(cm$^2$·sec·Pa) or lower is used for the composition of the present invention.

The thermoplastic resin (A) is not particularly limited, and examples thereof include polyolefin resins (such as a high density polyethylene (HDPE), a low density polyethylene (LDPE), a linear low density polyethylene (LLDPE), an ultra-high molecular weight polyethylene (UHMWPE), an isotactic polypropylene, a syndiotactic polypropylene, and an ethylene-propylene copolymer resin); polyamide resins (such as nylon 6 (N6), nylon 6,6 (N6,6), nylon 4,6 (N4,6), nylon 11 (N11), nylon 12 (N12), nylon 6,10 (N6,10), nylon 6,12 (N6, 12), a nylon 6/6,6 copolymer (N6/6,6), a nylon 6/6,6/6,10 copolymer (N6/6,6/6,10), a nylon MXD6 (MXD6), nylon 6T, a nylon 6/6T copolymer, a nylon 6,6/PP copolymer, and a nylon 6,6/PPS copolymer); polyester resins (such as aromatic polyesters including polybutylene terephthalate (PBT) and polyethylene terephthalate (PET)); polyether resins (such as polyphenylene oxide (PPO), modified polyphenylene oxide (modified PPO), polysulfone (PSF), and polyether ether ketone (PEEK)); polymethacrylate resins (such as polymethyl methacrylate (PMMA) and polyethyl methacrylate); polyvinyl resins (such as a vinyl alcohol/ethylene copolymer (EVOH), polyvinylidene chloride (PVDC), and a vinylidene chloride/methyl acrylate copolymer); and fluororesins (such as polyvinylidene fluoride (PVDF) and polychlorofluoroethylene (PCTFE)); and polyacrylonitrile resins (PAN).

Of those, polyolefin resins, polyester resins, polyether resins, and fluororesins each having a heat distortion temperature of 50° C. or higher are preferable because the composition of the present invention to be obtained has good moldability and good resistance to heat deformation due to, for example, the outside air temperature when the composition of the present invention is used in a spacer or the like of an insulating glass unit to be described later, and reduction in moisture vapor transmission due to moisture absorption can be suppressed.

In addition, the thermoplastic resin is more preferably a low density polyethylene (LDPE) or a linear low density polyethylene (LLDPE) because the resulting composition has a low heat shrinkage, good moldability, and a low moisture vapor permeability and an insulating glass unit produced using the composition is excellent in initial dew point performance.

The reason why each of the LDPE and the LLDPE is excellent in initial dew point performance, details of which are unclear, is probably as follows: The moisture vapor permeability of each of the LDPE and the LLDPE is in a suitable range, so the moisture in the air layer easily permeates the spacer (the thermoplastic resin composition) and the moisture in the air layer is quickly absorbed thereinto.

The thermoplastic resin (A) may be used alone or as a mixture of two or more resins.

In the present invention, the moisture vapor permeability of the thermoplastic resin (A) is $1.0 \times 10^{-13}$ cm$^3$·cm/(cm$^2$·sec·Pa) or lower. When the moisture vapor permeability falls within this range, an insulating glass unit obtained using the composition of the present invention is excellent in dew point performance.

In particular, the moisture vapor permeability of the thermoplastic resin (A) is preferably $5.0 \times 10^{-14}$ cm$^3$·cm/(cm$^2$·sec·Pa) or lower because the dew point performance in classes I to III of the accelerated aging test described in JIS R3209-1998 is satisfied, and the dew point performance at an initial stage and under high-temperature and high-humidity conditions are also excellent.

In the same point, the moisture vapor permeability of the thermoplastic resin (A) is preferably $1.0 \times 10^{-15}$ cm³·cm/(cm²·sec·Pa) or higher (and $1.0 \times 10^{-13}$ cm³·cm/(cm²·sec·Pa) or lower) because the dew point performance is more excellent.

The unvulcanized rubber (B) to be used in the present invention is at least one kind of unvulcanized rubber selected from the group consisting of a halogenated isoolefin/para-alkylstyrene copolymer and an ethylene propylene rubber.

When the unvulcanized rubber (B) is used, in the production of an insulating glass unit, retention stability at the time of melting and heating for applying the composition of the present invention to a glass plate is particularly excellent, and no increase in viscosity of the composition occurs, so the productivity of insulating glass units can be improved.

The use of a halogenated isoolefin/para-alkylstyrene copolymer or an ethylene propylene rubber, or a mixture thereof for the unvulcanized rubber provides extremely excellent heat resistance.

The halogenated isoolefin/para-alkylstyrene copolymer is not particularly limited, and the mixing ratio of halogenated isoolefin to para-alkylstyrene, the rate of polymerization, the average molecular weight, the polymerization form (such as block copolymer or random copolymer), the viscosity and the halogen atom to be used can be arbitrarily determined in accordance with, for example, the requisite physical properties of the thermoplastic resin composition.

The halogenated isoolefin/para-alkylstyrene copolymer is preferably a halide of a copolymer of para-methylstyrene and polyisobutylene (X-IPMS) because it is more excellent in the above effects, and is more preferably Br-IPMS.

The halogenated isoolefin/para-alkylstyrene copolymer may be synthesized in accordance with an ordinary method, or may be a commercially available product. An example of the commercially available product includes Br-IPMS [Exxpro 3433] manufactured by Exxon.

The ethylene propylene rubber is also not particularly limited, and can be arbitrarily selected in accordance with, for example, the requisite physical properties of the thermoplastic resin composition. Examples of the ethylene propylene rubber include EPDM and EPM.

The ethylene propylene rubber may be synthesized in accordance with an ordinary method, or may be a commercially available product. Examples of the commercially available product include EPDM "EPT 3045" manufactured by Mitsui Chemicals, Inc. and Esprene 514.

At least one kind selected from the group consisting of the halogenated isoolefin/para-alkylstyrene copolymer and the ethylene propylene rubber is used for the unvulcanized rubber (B). In this case, two or more kinds of unvulcanized rubbers of the same type may be used.

The unvulcanized rubber (B) may be used as an unvulcanized rubber composition containing one or more additives as described below.

Examples of the additive include a reinforcing agent, a filler, a softening agent, a cross-linking agent, an age inhibitor, and a processing aid to be generally compounded for improving, for example, the dispersibility of the unvulcanized rubber (B) in the thermoplastic resin (A), heat resistance, and the like. Those additives may be compounded as appropriate.

In the composition of the present invention, there is no particular limitation on the combination of the thermoplastic resin (A) and the unvulcanized rubber (B), and one or more kinds of thermoplastic resins (A) selected from the thermoplastic resins described above and one or more kinds of unvulcanized rubbers (B) selected from the rubbers described above can be used in combination.

One of a low density polyethylene (LDPE) and a linear low density polyethylene (LLDPE) as the thermoplastic resin (A) is preferably combined with one of a halogenated isoolefin/para-alkylstyrene copolymer and an ethylene propylene rubber (EPDM or EPM) as the unvulcanized rubber (B) because the effects of the present invention are more advantageously achieved.

In the composition of the present invention, the compounding ratio of the thermoplastic resin (A) to the unvulcanized rubber (B) (the thermoplastic resin (A)/the unvulcanized rubber (B)) is 85/15 to 15/85 in weight ratio.

When the weight ratio falls within the above range, the hardness of the composition is in a suitable range and production failure due to collapse of the composition during the production of an insulating glass unit can be suppressed (the insulating glass unit is excellent in workability). In addition, the insulating glass unit is also excellent in dew point performance in the accelerated aging test described in JIS R3209-1998, especially in classes II and III.

The weight ratio is more preferably 30/70 to 70/30 or still more preferably 40/60 to 60/40 because the effects are more advantageously achieved.

The critical point of the weight ratio can be determined from the volume ratio and the viscosity ratio between the thermoplastic resin (A) and the unvulcanized rubber (B).

In the composition of the present invention, the unvulcanized rubber (B) serves as a disperse phase, while the thermoplastic resin (A) serves as a continuous phase. However, simple kneading of both the components in molten states does not necessarily provide a desired thermoplastic resin composition having a dispersed structure. It is preferable that the compounding ratio (volume ratio) between the two components be controlled to adjust the relationship between the melt viscosities of the thermoplastic resin (A) and the unvulcanized rubber (B) at their respective kneading temperatures in such a manner that the value of $\alpha_1$ as determined by the following expression becomes less than 1.

$$\alpha_1 = (\Phi_R/\Phi_P) \times (\eta_P/\eta_R)$$

(where $\Phi_R$ represents the volume fraction of the unvulcanized rubber (B), $\Phi_P$ represents the volume fraction of the thermoplastic resin (A), $\eta_R$ represents the melt viscosity (Poise) of the unvulcanized rubber (B) at the temperature at which, and under the shear rate condition under which the thermoplastic resin (A) and the unvulcanized rubber (B) are kneaded together, and $\eta_P$ represents the melt viscosity (Poise) of the thermoplastic resin (A) at the temperature at which, and under the shear rate condition under which the thermoplastic resin (A) and the unvulcanized rubber (B) are kneaded together.)

When the value of $\alpha_1$ determined by the expression is equal to or larger than 1, the dispersed structure of the composition of the present invention is reversed, and the unvulcanized rubber (B) may serve as a continuous phase in some cases. In addition, $0.5 \leq \eta_R/\eta_P \leq 3.0$ is preferably established. When $\eta_R/\eta_P$ falls within the above range, the unvulcanized rubber (B) is dispersed as particles each having a size of 0.1 micrometer to several tens of micrometers into the thermoplastic resin (A).

In the present invention, the term "melt viscosity" refers to the melt viscosity of each component at an arbitrary temperature during kneading. The melt viscosity of a polymer component, which varies with the temperature, shear rate (sec$^{-1}$) and shear stress, is in general a value determined in accordance with the following expression by allowing the polymer component in a molten state to flow into a capillary at an arbitrary temperature at which the polymer component is in a molten state, especially in a temperature region at the time of kneading; and measuring the stress and the shear rate.

$$\eta = \sigma/\dot{\gamma} \qquad \text{[Mathematical Formula 1]}$$

(where σ represents the shear stress and $\dot{\gamma}$ represents the shear rate.)

For example, a capillary rheometer, Capillograph 1C manufactured by Toyo Seiki Seisakusho can be used for measuring the melt viscosity.

The moisture absorbent (C) is used for the composition of the present invention. By incorporating a moisture absorbent into the composition of the present invention, the composition of the present invention can be used for a sealant or spacer, especially a spacer also serving as a sealant of an insulating glass unit.

Here, the composition is formed into the spacer which is arranged between peripheral portions of opposing glass plates of an insulating glass unit for securing the thickness of an air layer of the insulating glass unit; and the spacer is also used as a sealant by being brought into press contact with the glass plates to shield the air layer from outside air and without separately placing a sealant between the spacer and each of the glass plates. That is, when the composition of the present invention is used as a spacer also serving as a sealant, it simultaneously doubles as a spacer and a sealant. The composition of the present invention may be used for a sealant of an insulating glass unit or as a spacer also serving as a sealant.

When the spacer made of the composition of the present invention which contains a moisture absorbent is used as a sealant in an insulating glass unit, the productivity of the insulating glass unit can be improved. Further, the moisture contained in an air layer in the structure of the insulating glass unit is absorbed to dry the air layer, and moisture penetrating into the insulating glass unit from outside is absorbed to prevent an increase in dew point of air sealed in the air layer. The dew point in an insulating glass unit refers to the maximum temperature at which condensation is visually observed on the inner surfaces of the insulating glass unit.

A moisture absorbent generally filled into a metal spacer or the like of an insulating glass unit can be used as the moisture absorbent (C) of the insulating glass unit of the present invention without any particular limitation. Examples thereof include synthetic zeolite, silica gel, and alumina.

The compounding amount of the moisture absorbent (C) is 10 to 70 parts by weight to 100 parts by weight of the total of the thermoplastic resin (A) and the unvulcanized rubber (B). When the compounding amount falls within the above range, the composition of the present invention obtained has excellent hygroscopicity. The compounding amount is preferably 10 to 30 parts by weight in terms of more excellent hygroscopicity.

The composition of the present invention preferably further contains a moisture vapor barrier resin (hereinafter, simply referred to as the "barrier resin"). Although the composition of the present invention is excellent in resistance to moisture vapor transmission, the resistance to moisture vapor transmission is further enhanced by incorporating the barrier resin therein.

The barrier resin as used herein is a resin having a moisture vapor transmission rate equal to or lower than that of the thermoplastic resin (A) serving as a continuous phase. The same type of the barrier resin as the thermoplastic resin (A) serving as a continuous phase, or a resin that can serve as a barrier through a high degree of crystallization or otherwise may be used. The composition of the present invention is kneaded with the barrier resin preferably in a layer shape, and the layer shape of the barrier resin with which the composition of the present invention is kneaded preferably has an aspect ratio (defined as a ratio a/b where a is the major axis length and b is the minor axis length) of 10 to 500.

In an insulating glass unit using the spacer which is made of the composition of the present invention and which also serves as a sealant (a second embodiment of the present invention), it is preferable that the barrier resin be present in the continuous phase of the composition of the present invention and dispersed as a plate-like layer parallel with the peripheral surface of the insulating glass unit from the viewpoint of resistance to moisture vapor transmission. Dispersion of the barrier resin in a layer shape prevents the transmission of moisture vapor to thereby reduce the moisture vapor transmission rate.

The resin component constituting the barrier resin is not particularly limited, and examples thereof include: polyolefins such as a high density polyethylene (HDPE) and an ultrahigh molecular weight polyethylene (UHMWPE); polyamide resins such as nylon 6, nylon 6,6, and aromatic nylons (MXD6); polyester resins such as polyethylene terephthalate (PET); polyvinyl resins such as ethylene-vinyl alcohol (EVOH); polyvinyl chloride resins; and polyvinylidene chloride (PVDC)). In the present invention, the barrier resin may be composed of one of them or a combination of two or more of them.

When the composition of the present invention contains a barrier resin, the content of the barrier resin is preferably determined as appropriate so that the melt viscosities and volume fractions of the thermoplastic resin (A) corresponding to a portion obtained by removing the barrier resin from the composition of the present invention; and the barrier resin satisfy the following expressions (1) and (2). The weight ratio of the thermoplastic resin (A) to the barrier resin is typically 90/10 to 50/50, or particularly preferably 90/10 to 70/30.

$$\eta_d/\eta_m \geq 2.0 \qquad (1)$$

$$\alpha_2 = (\Phi_d/\Phi_m) \times (\eta_m/\eta_d) < 1.0 \qquad (2)$$

(In the expressions, $\eta_d$ represents the melt viscosity (poise) of the barrier resin, $\eta_m$ represents the melt viscosity (poise) of the thermoplastic resin (A), $\Phi_d$ represents the volume fraction of the barrier resin, and $\Phi_m$ represents the volume fraction of the thermoplastic resin (A).)

In the expression (1), $\eta_d/\eta_m$ preferably takes a value of 2.0 or more in view of more enhanced barrier function, and $\eta_d/\eta_m$ more preferably takes a value of 3.0 or more. In addition, when $\alpha_2$ takes a value of less than 1.0 in the expression (2), the barrier resin can be present as a disperse phase in the continuous phase of the thermoplastic resin (A).

In one preferred embodiment, the composition of the present invention further contains an inorganic filler in addition to the above respective components.

Inclusion of an inorganic filler in the composition of the present invention enables reduction of the heat shrinkage, improvement of the moldability, and maintenance of the discharge property (fluidity).

The inorganic filler is not particularly limited, and examples thereof include: talc; mica; fumed silica, calcined silica, precipitated silica, pulverized silica, and molten silica; diatomaceous earth; iron oxide, zinc oxide, titanium oxide, barium oxide, and magnesium oxide; carbonates, sulfates, sulfites, and phosphates of alkaline earth metals such as calcium, magnesium, and barium; agalmatolite clay, kaolin clay, and calcined clay; and fatty acids, resin acids, and fatty acid esters thereof. Each of them may be used alone, or two or more of them may be used in combination.

Of those, talc and calcium carbonate are suitably used because they are excellent in improving the moldability, and talc is particularly suitably used.

Talc to be used in the present invention is not particularly limited, and may or may not be subjected to a surface treatment. Examples of the surface treatment include a chemical or physical treatment using a treatment agent such as a silane coupling agent, a higher fatty acid, a metal salt of a fatty acid, and an organic titanate. Specific examples of the talc to be suitably used include a Talc F manufactured by Nippon Talc Co., Ltd. and a Mistron Vapor manufactured by Nihon Mistron Co., Ltd. Each of them may be used alone, or two or more of them may be used in combination.

Calcium carbonate to be used in the present invention is not particularly limited, and examples thereof include heavy calcium carbonate, precipitated calcium carbonate (light calcium carbonate), and colloidal calcium carbonate. Calcium carbonate subjected to a surface treatment with a fatty acid, a resin acid, a fatty acid ester, a higher alcohol-added isocyanate compound, or the like may also be used. Specific examples of the calcium carbonate that can be suitably used include heavy calcium carbonates such as heavy calcium carbonate manufactured by Maruo Calcium Co., Ltd., a Whiton P-30 manufactured by Shiraishi Kogyo Kaisha, Ltd., and a Sunlight SL-100 manufactured by Takehara Kagaku Kogyo Co., Ltd. Each of them may be used alone, or two or more of them may be used in combination.

The content of the inorganic filler is preferably 30 to 200 parts by weight, and more preferably 50 to 150 parts by weight to 100 parts by weight of the total of the thermoplastic resin (A) and the unvulcanized rubber (B) in terms of more excellent moldability.

For improving fluidity, heat resistance, heat shrinkage, and physical strength and realizing cost reduction, additives such as other fillers than the inorganic fillers described above (e.g., carbon black); tackifiers such as a hydrogenated petroleum resin, a terpene phenol resin, a rosin ester, or a coumarone resin; an age inhibitor; a heat stabilizer; an antioxidant; a softening agent; or a processing aid may be added to the composition of the present invention in the amounts that does not adversely affect the merits of the invention. An inorganic pigment or an organic pigment may also be added to the composition of the present invention for the purpose of coloring or the like.

The composition of the present invention may further include an adhesiveness imparting agent for improving adhesiveness to glass.

The adhesiveness imparting agent is not particularly limited, and examples thereof include silane coupling agents such as vinyl silane, methacryl silane, amino silane, epoxy silane, and mercapto silane; and polymers each having a maleic group, a carboxy group, a hydroxy group, an epoxy group, or the like. Examples of the polymer include maleic acid-modified polyethylene, maleic acid-modified polypropylene, maleic acid-modified ethylene ethyl acrylate, an epoxy-modified styrene-butadiene copolymer, an epoxy-modified ethylene-vinyl acetate copolymer, and an ethylene-vinyl acetate copolymer, and saponified products thereof.

When the thermoplastic resin (A) and the unvulcanized rubber (B) are different from each other in chemical compatibility, an appropriate compatibilizer is preferably used to make them compatible with each other. When a compatibilizer is mixed with the thermoplastic resin (A) and the unvulcanized rubber (B), the surface tension therebetween is reduced, and as a result, the particle size of the unvulcanized rubber (B) forming the disperse phase is reduced and hence the properties of the thermoplastic resin (A) and the unvulcanized rubber (B) can be more effectively expressed.

The compatibilizer is not particularly limited, and general examples thereof include compatibilizers each having the structure of: a copolymer having one or both of a resin component and a rubber component; or a copolymer having an epoxy group, a carboxy group, a carbonyl group, a halogen atom, an amino group, an oxazoline group, a hydroxyl group, or the like capable of reacting with the resin component or the rubber component. Those compatibilizers can be selected depending on the nature of the thermoplastic resin (A) and the unvulcanized rubber (B) with which the compatibilizer is to be mixed. Examples of a general-purpose compatibilizer include: a styrene/ethylene/butylene/styrene-based block copolymer (SEBS) and a maleic acid-modified product thereof; EPDM and EPM, and maleic acid-modified products thereof; an EPDM/styrene or EPDM/acrylonitrile graft copolymer and a maleic acid-modified product thereof; a styrene/maleic acid copolymer; and reactive phenoxy resin.

When a compatibilizer is to be included in the composition of the present invention, its compounding amount is not particularly limited, and is preferably 0.5 to 20 parts by weight to 100 parts by weight of the total of the thermoplastic resin (A) and the unvulcanized rubber (B).

The composition of the present invention is prepared by supplying to a kneader such as a twin screw kneader, the thermoplastic resin (A) and the unvulcanized rubber (B) satisfying the above weight ratio and the moisture absorbent (C) satisfying the above content; melting and kneading the mixture; and dispersing the unvulcanized rubber (B) as a disperse phase (domain) in the thermoplastic resin (A) forming a continuous phase (a matrix phase).

Various additives may be added to the thermoplastic resin (A) or the unvulcanized rubber (B) during the kneading operation, but are preferably added prior to the kneading.

The kneading machine to be used for kneading is not particularly limited, and examples of the kneading machine include a screw extruder, a kneader, a Banbury mixer, and a twin screw kneading extruder. A twin screw kneading extruder is particularly preferably used. Two or more kinds of kneading machines may be used to perform sequential kneading.

The temperature for melting and kneading should be equal to or higher than the melting temperature of the thermoplastic resin (A). When the composition contains a barrier resin, the temperature should be equal to or higher than the melting temperature of the thermoplastic resin (A) and lower than the heat distortion temperature of the barrier resin. The shear rate at the time of kneading is preferably 500 to 7,500 $sec^{-1}$. The total time for kneading is preferably 30 seconds to 10 minutes.

Next, the prepared thermoplastic resin composition may be extruded from a kneading extruder in a strand shape, cooled with water or the like, and pelletized by means of a pelletizer for resin, followed by molding. Alternatively, the prepared high-temperature thermoplastic resin composition may be directly cast and filled as a sealant for an insulating glass unit into a gap surrounded by portions near the peripheral portions of glass plates of the insulating glass unit and a spacer that has already been arranged. In this case, a thermoplastic resin composition which was just discharged from a molding machine and is still at a high temperature is preferably used because the adhesiveness between each of the glass plates and the spacer is increased. Alternatively, the prepared thermoplastic resin composition may be molded into a spacer by means of extrusion molding, injection molding, or the like.

When the composition of the present invention contains the barrier resin, a pellet obtained by molding the thermoplastic resin composition prepared as described above and a pellet of the barrier resin should be mixed at a predetermined ratio. Both the pellets may be mixed by any method such as a method involving dry-blending by a commonly used blender or the like or a method involving supplying each pellet from an independent feeder to a kneader at a predetermined ratio.

Next, the mixture of both the pellets is treated as follows: The thermoplastic resin composition and the barrier resin may be molten and kneaded for example in a single screw extruder at a low shear rate (of, for example, 30 sec$^{-1}$ or more but less than 300 sec$^{-1}$), and extruded from the tip of the extruder or subjected to injection molding so that the molten and kneaded product is directly supplied to a molding machine to be used for the production of a spacer. Alternatively, the molten and kneaded product may be extruded from the tip of the extruder in a strand shape and pelletized to be used in molding.

When a spacer or the like of an insulating glass unit is made of the composition of the present invention, the barrier resin is preferably oriented as a plate-like layer parallel with the peripheral surface of the insulating glass unit. The barrier resin is effectively oriented as described above by a method in which the nozzle shape at the time of extrusion of the composition of the present invention is made flat and the share rate at the exit of an injection molding machine or an extruder is set at 30 to 300 sec$^{-1}$.

The composition of the present invention is excellent in heat resistance, has low heat shrinkage, is excellent in resistance to moisture vapor transmission, and can improve the productivity of insulating glass units.

Next, the insulating glass unit of the present invention will be described.

Figure 1:
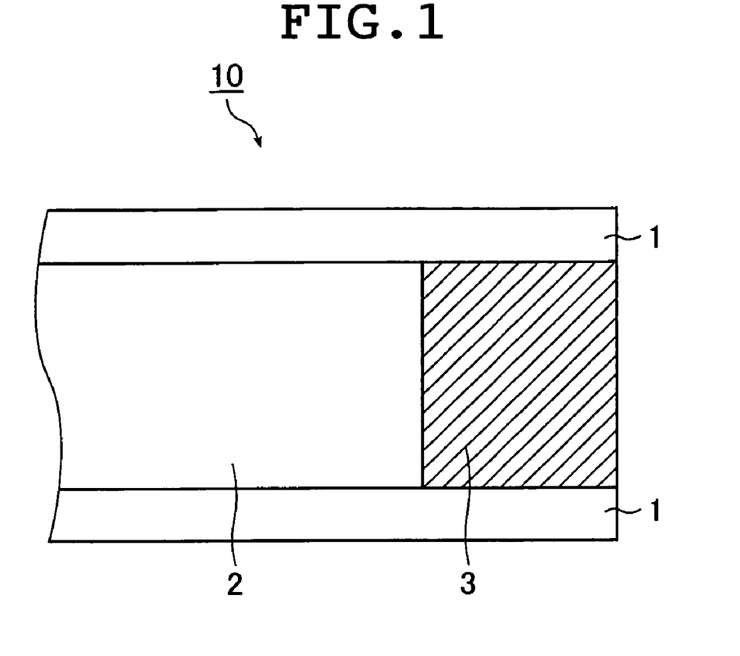
FIG. 1 is a schematic sectional view showing an example of the constitution of an insulating glass unit according to a first embodiment of the present invention.

An insulating glass unit according to a first embodiment of the present invention uses a spacer made of the composition of the present invention. For example, the insulating glass unit has two or more glass plates arranged so as to be opposed to each other through a spacer; an air layer is formed by the two glass plates and the spacer; and the spacer is made of the composition of the present invention. FIG. 1 is a schematic sectional view showing an example of the constitution of the insulating glass unit according to the first embodiment of the present invention.

In FIG. 1, reference numeral 1 denotes a glass plate; 2, an air layer; 3, a spacer; and 10, an insulating glass unit.

The insulating glass unit according to the first embodiment is the insulating glass unit 10 in which the spacer 3 for determining the distance between the two glass plates 1 is arranged between the two glass plates 1 arranged so as to be opposed to each other so that the air layer 2 having a predetermined volume is formed between the two glass plates 1, and which uses the spacer 3 made of the composition of the present invention 3.

The insulating glass unit according to the first embodiment is produced by using the spacer made of the composition of the present invention. Therefore, the production process is easy and the insulating glass unit is excellent in heat resistance, moldability, and dew point performance. Furthermore, the insulating glass unit of the present invention is a warm-edge type insulating glass unit in which heat of outside air is hardly conducted through the composition of the invention used in the form of the spacer and which is thus superior in heat insulating properties to an insulating glass unit using a metal spacer having a high heat conductivity.

The other features on the constitution, structure, and the like of the insulating glass unit according to the first embodiment are not particularly limited as long as the space made of the composition of the present invention is used.

Figure 3:
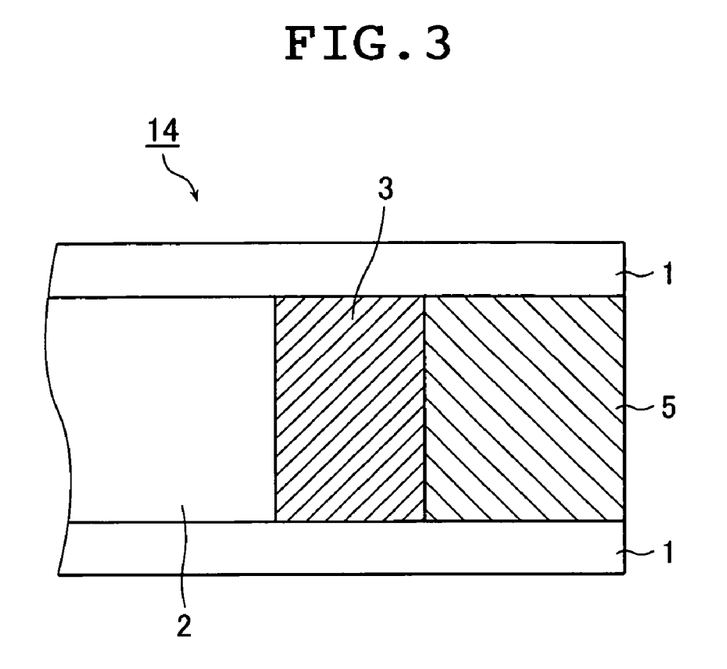
FIG. 3 is a schematic sectional view showing an example of the constitution of an insulating glass unit according to a first mode of a fourth embodiment of the present invention.

For example, the shape of the spacer 3 is not limited to the shape shown in FIG. 1 but the spacer 3 may have the shape shown in FIG. 3 or the like. A sealant and/or an adhesive layer may be provided between the spacer 3 and each of the glass plates 1. A sealant or the like for sealing the spacer and the like from outside air may be provided at peripheral ends of the glass plates. The number of the glass plates 1 is not limited to two but may be two or more. The number of the glass plates 1 can be determined as appropriate.

The distance between the glass plates 1 forming the air layer 2 in the insulating glass unit of the present invention is not particularly limited, but is preferably about 6 mm or about 12 mm in general.

The spacer made of the composition of the present invention has preferably a JIS A hardness of 50 to 100. When the hardness falls within this range, even when a stress is applied to a contact surface between each of the glass plates and the spacer due to temperature increase in the air layer, the glass is prevented from being broken when the adhesion force is strong and the glass plate is also prevented from being peeled of the spacer when the adhesion force is insufficient. When the hardness falls within this range, the insulating glass unit is also prevented from deforming due to the weight of the glass plates.

An insulating glass unit according to the second embodiment of the present invention uses the spacer which is made of the composition of the present invention and which also serves as a sealant. That is, in this embodiment, the spacer 3 of the insulating glass unit according to the first embodiment also serves as a sealant at a time to seal the air layer from outside air. As described above, in the second embodiment, the spacer 3 serves as a sealant for preventing the permeation of outside moisture therethrough without using a primary sealant (an adhesive layer) or a secondary sealant, and also serves as the spacer 3 for maintaining the distance between the two glass plates at a predetermined value.

The insulating glass unit according to the second embodiment has the same properties as those of the insulating glass unit according to the first embodiment. In addition, the insulating glass unit according to the second embodiment which does not use a primary sealant or a secondary sealant is capable of reducing the production cost and further simplifying the production process.

As in the insulating glass unit according to the first embodiment, the other features on the constitution, structure, and the like of the insulating glass unit according to the second embodiment are not particularly limited as long as the insulating glass unit according to the second embodiment uses the spacer which is made of the composition of the present invention and also serves as a sealant.

An insulating glass unit according to a third embodiment of the present invention uses a spacer which is made of the composition of the present invention and also serves as a sealant, and has adhesive layers arranged partly or entirely in spaces between the composition of the present invention and glass. For example, the insulating glass unit has two or more glass plates arranged so as to be opposed to each other through a spacer; and an air layer formed by the two glass plates, the spacer, and adhesive layers each arranged between each of the glass plates and the spacer, and has the spacer made of the composition of the present invention.

Figure 2:
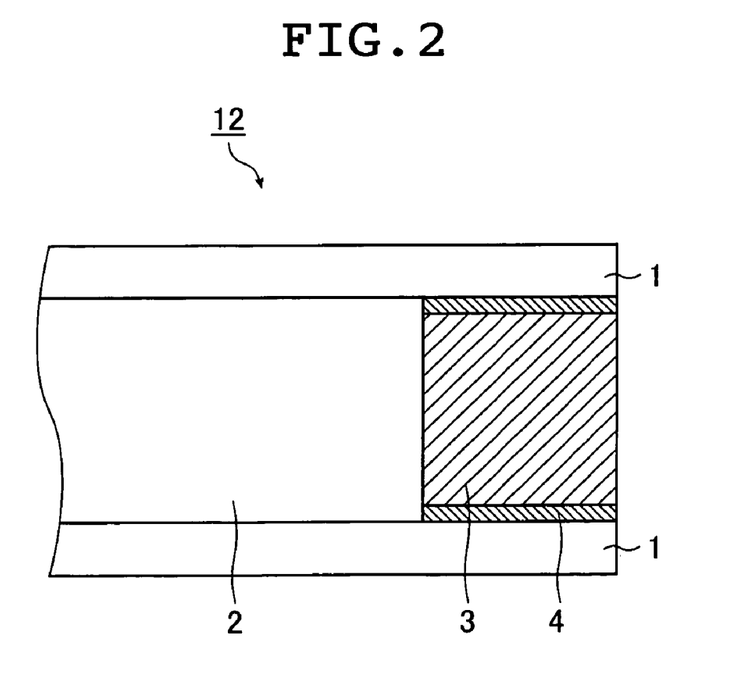
FIG. 2 is a schematic sectional view showing an example of the constitution of an insulating glass unit according to a third embodiment of the present invention.

FIG. 2 is a schematic sectional view showing an example of the constitution of the insulating glass unit according to the third embodiment of the present invention.

In FIG. 2, reference numeral 1 denotes a glass plate; 2, an air layer; 3, a spacer; 4, an adhesive layer; and 12, an insulating glass unit.

The insulating glass unit shown in FIG. 2 has the same structure as that of the insulating glass unit according to the first embodiment, and also has the adhesive layers 4 between the spacer 3 also serving as a sealant and the glass plates 1. Since the insulating glass unit according to the third embodiment has the same properties as those of the insulating glass unit according to the first embodiment, and has the adhesive layers 4, the adhesiveness between the spacer 3 and each of the glass plates 1 is enhanced, permeation of moisture from the outside of the insulating glass unit is prevented, and the dew point performance of the air layer 2 is more excellent.

As in the insulating glass unit according to the first embodiment, the other features on the constitution, structure, and the like of the insulating glass unit according to the third embodiment are not particularly limited as long as the insulating glass unit according the third embodiment uses the spacer which is made of the composition of the present invention and also serves as a sealant and also has the adhesive layers.

An insulating glass unit according to a fourth embodiment of the present invention is obtained by further providing the insulating glass unit according to the first or third embodiment with a secondary seal.

Specifically, according to a first mode of the fourth embodiment, there is provided an insulating glass unit which has two or more glass plates arranged so as to be opposed to each other through a spacer; and a hollow layer formed by the two glass plates and the spacer, and uses the spacer made of the composition of the present invention and in which a gap formed by the outer peripheral surface of the spacer and the inner surfaces of the peripheral portions of the two glass plates is sealed with a sealant. According to a second mode of the fourth embodiment, there is provided an insulating glass unit which has two or more glass plates arranged so as to be opposed to each other through a spacer; and a hollow layer formed by the two glass plates, the spacer, and adhesive layers each of which is arranged partly or entirely in a space between each of the glass plates and the spacer, and uses the spacer made of the composition of the present invention and in which a gap formed by the outer peripheral surface of the spacer, the adhesive layers, and the inner surfaces of the peripheral portions of the two glass plates is sealed with a sealant.

Figure 4:
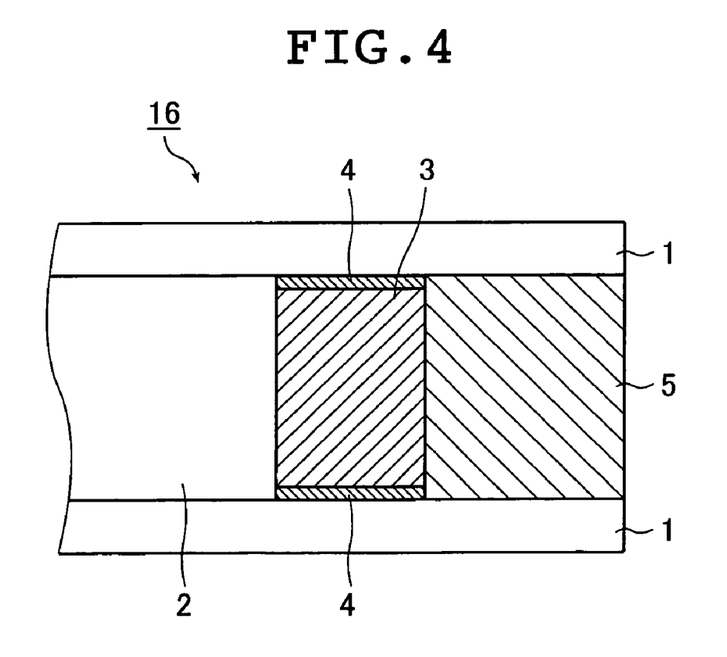
FIG. 4 is a schematic sectional view showing an example of the constitution of an insulating glass unit according to a second mode of the fourth embodiment of the present invention.

FIG. 3 is a schematic sectional view showing an example of the constitution of the insulating glass unit according to the first mode of the fourth embodiment of the present invention. FIG. 4 is a schematic sectional view showing an example of the constitution of the insulating glass unit according to the second mode of the fourth embodiment of the present invention.

In FIGS. 3 and 4, reference numeral 1 denotes a glass plate; 2, an air layer; 3, a spacer; 4, an adhesive layer; 5, a secondary sealant; and 14 and 16, insulating glass units.

In the insulating glass unit according to the first mode of the fourth embodiment provided with the secondary sealant, the spacer 3 is arranged near the peripheral portions of the glass plates 1 so that the secondary sealant 5 can be arranged, and a gap formed by the outer peripheral surface of the spacer 3 and the inner surfaces of the peripheral portions of the glass plates 1 is sealed (filled) with the sealant. The insulating glass unit according to the second mode of the fourth embodiment is the insulating glass unit according to the first mode of the fourth embodiment in which the adhesive layer 4 is arranged between each of the glass plates 1 and the spacer 3.

Each of the insulating glass units according to the fourth embodiment has the same properties as those of each of the insulating glass units according to the first and third embodiments, is excellent in dew point performance, especially dew point performance under high-temperature and high-humidity conditions, and is particularly excellent in reliability of dew point performance.

Since the insulating glass units according to the respective embodiments of the present invention have the respective properties as described above, any of the insulating glass units according to the respective embodiments can be arbitrarily selected depending on, for example the application where the insulating glass unit is to be used.

A glass plate used for a building material, a vehicle, or the like can be used for the glass plate 1 to be used in the insulating glass unit according to each of the embodiments of the present invention. Examples thereof include glass ordinarily used for a window or the like, tempered glass, wire-reinforced glass, heat-absorbing glass, heat-reflecting glass, and organic glass. The thickness of the glass is determined as appropriate.

The resin to be used for the adhesive layers 4 to be arranged in the insulating glass unit according to each of the third and fourth embodiments of the present invention is not particularly limited, and examples thereof include an adhesive based on butyl rubber or polyisobutylene (PIB) and a hot melt adhesive. Of those, a PIB sealant is preferable because of its high adhesiveness to glass, excellent sealing property, and excellent dew point performance.

A composition containing the following main materials is preferably used for the secondary seal to be arranged in the insulating glass unit according to the fourth embodiment of the present invention. A butyl rubber-based hot melt, a material having a low moisture vapor permeability, and butyl rubber-based, polysulfide-based, silicone-based, and urethane-based hot melts which can cure quickly are suitably used as the main materials.

The insulating glass unit of the present invention can be basically produced by extruding the composition of the present invention through a nozzle connected to an extruder or the like to bond the two parallel glass plates 1 fixed to a machine. At this time, a primer may be applied as required to a portion of the glass plate 1 to which the spacer 3 is to be adhered, and furthermore an adhesive may also be applied as required to this portion. In some cases, the composition of the present invention is extruded to the surface of one glass plate and the other glass plate is brought into press contact with the composition before the composition is cooled.

A primer and an adhesive may be applied manually by means of an applicator or the like, or may be applied by means of a robot that automatically extrudes the primer and the adhesive. In particular, the composition of the present invention and an adhesive may be co-extruded by means of an extruder to provide a structure in which the adhesive serves as an outer layer and the composition of the present invention is placed inside the outer layer, and the structure may be molded into a predetermined spacer shape. Alternatively, the composition of the present invention and the adhesive that have been extruded may be directly discharged to a space between the peripheral portions of the glass plates.

The composition of the present invention forming a spacer is preferably used in a high-temperature state after kneading even in the case where the composition is molded into a spacer to be arranged on glass plates or in the case where the composition is directly discharged from an extruder to a space between the glass plates. This is because stronger adhesiveness is established between the spacer and each of the glass plates.

The insulating glass unit according to the fourth embodiment provided with a secondary seal can be produced basically in the same manner as above. That is, the insulating glass unit can be produced by forming a spacer in the same manner as described above optionally through application of a primer and/or an adhesive; and applying (filling) a secondary sealant to (into) a gap by means of an applicator, an extruder, or the like.

The insulating glass unit of the present invention adopting such constitution has the following advantages as well as the properties of each of the embodiments.

That is, because of its significantly reduced number of production steps, the insulating glass unit of the present invention can be more easily produced than a conventional insulating glass unit produced by using a metal spacer and a sealant, and the insulating glass unit of the present invention is also excellent in heat insulating properties.

The insulating glass unit of the present invention uses the thermoplastic resin composition of the present invention for a spacer or the like, and hence does not require a long time for curing unlike a conventional two-component type sealant and has high productivity.

EXAMPLES

Hereinafter, the present invention will be described specifically by way of examples. However, the present invention is not limited to these examples.

Examples 1 to 5 and 7 to 10, and Comparative Examples 1, 2 and 5 to 7

An unvulcanized rubber, a moisture absorbent, a liquid rubber, and one or more fillers shown in Table 1 were mixed in a Banbury mixer or a pressurized kneader, and the mixture was pelletized at about 100° C. by means of a pelletizer for rubber. After that, the palletized mixture was dry-blended with a thermoplastic resin at a compounding ratio (part by weight) shown in Table 1, and the whole was charged into a twin screw kneader, and molten and kneaded. The temperature and shear rate of the twin screw kneader were set at 150° C. and 1,000 sec$^{-1}$, respectively.

The thermoplastic resin composition extruded from the twin screw kneader in a strand shape was cooled with water and pelletized by means of a pelletizer for resin.

The above material was extruded through a nozzle to a peripheral portion of one square glass plate with a side length of 300 mm. Next, another square glass plate with a side length of 300 mm was bonded under pressure to the above glass plate so that they were adhered to each other. Furthermore, a gap portion formed by inner surfaces of peripheral portions of the two glass plates and an outer peripheral surface of the spacer thus formed was filled with a butyl rubber composition as a secondary seal by means of a hot melt applicator to produce an insulating glass unit provided with the secondary seal.

In addition, each pellet of the thermoplastic resin composition was formed through press molding into a 1 mm-thick sheet, which was then used as a sample (sample sheet) for measuring the moisture vapor transmission rate.

Example 6

An insulating glass unit having no secondary seal was produced in the same manner as in Example 1 except that no secondary seal was arranged.

Comparative Example 3

An unvulcanized rubber shown in Table 1 was pelletized at about 100° C. by means of a pelletizer for rubber. After that, the unvulcanized rubber was dry-blended with a thermoplastic resin, an age inhibitor, a filler, and a tackifier at a compounding ratio (part by weight) shown in Table 1, and the whole was charged into a twin screw kneader, and molten and kneaded. Then, a vulcanizing agent was added from an intermediate port, and the whole was subjected to dynamic vulcanization. The temperature and shear rate of the twin screw kneader were set at 150° C. and 1,000 sec$^{-1}$, respectively.

A moisture absorbent and a tackifier were further charged from the final port of the twin screw kneader. The thermoplastic resin composition extruded from the twin screw kneader in a strand shape was cooled with water and pelletized by means of a pelletizer for resin.

The above material was extruded through a nozzle to a peripheral portion of one square glass plate with a side length of 300 mm. Next, another square glass plate with a side length of 300 mm was bonded under pressure to the above glass plate so that they were adhered to each other. Thus, an insulating glass unit having no secondary seal was produced.

In addition, each pellet of the thermoplastic resin composition was formed through press molding into a 1 mm-thick sheet, which was then used as a sample (sample sheet) for measuring the moisture vapor transmission rate.

Comparative Example 4

The thermoplastic resin composition used for the insulating glass unit of Comparative Example 3 was extruded through a nozzle to a peripheral portion of one square glass plate with a side length of 300 mm. Next, another square glass plate with a side length of 300 mm was bonded under pressure to the above glass plate so that they were adhered to each other. Furthermore, a gap portion formed by inner surfaces of peripheral portions of the two glass plates and an outer peripheral surface of the spacer thus formed was filled with a butyl rubber composition as a secondary seal by means of a hot melt applicator to produce an insulating glass unit provided with the secondary seal.

Comparative Example 8

An insulating glass unit having no secondary seal was produced in the same manner as in Comparative Example 5 except that no secondary seal was arranged.

TABLE 1

Table 1 (Part 1)

| | | Ex.1 | Ex.2 | Ex.3 | Ex.4 | Ex.5 | Ex.6 | Ex.7 | Ex.8 | Ex.9 | Ex.10 |
|---|---|---|---|---|---|---|---|---|---|---|---|
| Thermoplastic resin | HDPE | 60 | | | | | 60 | | | | |
| | LDPE | | 60 | | 60 | 60 | | 60 | 60 | 60 | 60 |
| | LLDPE | | | 60 | | | | | | | |

TABLE 1-continued

Table 1 (Part 1)

|  |  | Ex.1 | Ex.2 | Ex.3 | Ex.4 | Ex.5 | Ex.6 | Ex.7 | Ex.8 | Ex.9 | Ex.10 |
|---|---|---|---|---|---|---|---|---|---|---|---|
| Unvulcanized rubber | Br-IPMS | 40 | 40 | 40 |  | 40 | 40 | 40 | 40 | 40 | 40 |
|  | EPDM |  |  |  | 40 |  |  |  |  |  |  |
| Moisture absorbent |  | 33.3 | 33.3 | 33.3 | 33.3 | 33.3 | 33.3 | 33.3 | 33.3 | 33.3 | 33.3 |
| Liquid rubber | PIB | 13.3 | 13.3 | 13.3 | 13.3 | 13.3 | 13.3 | 13.3 | 13.3 | 13.3 | 13.3 |
| Filler | Carbon black | 1.3 | 1.3 | 1.3 | 1.3 | 1.3 | 1.3 | 1.3 | 1.3 | 1.3 | 1.3 |
|  | Talc |  |  |  |  | 33.3 |  | 50 | 100 | 200 |  |
|  | Calcium carbonate |  |  |  |  |  |  |  |  |  | 100 |
| Secondary seal |  | Present | Present | Present | Present | Present | Absent | Present | Present | Present | Present |

TABLE 2

Table 1 (Part 2)

|  |  | CEx. 1 | CEx. 2 | CEx. 3 | CEx. 4 | CEx. 5 | CEx. 6 | CEx. 7 | CEx. 8 |
|---|---|---|---|---|---|---|---|---|---|
| Thermoplastic resin | HDPE | 100 | 5 | 30 | 30 | 60 |  |  | 60 |
|  | LDPE |  |  |  |  |  | 60 |  |  |
|  | LLDPE |  |  |  |  |  |  | 60 |  |
| Unvulcanized rubber | Br-IPMS |  | 95 | 70 | 70 |  |  |  |  |
|  | Butyl rubber |  |  |  |  | 40 | 40 | 40 | 40 |
| Moisture absorbent |  | 33.3 | 33.3 | 25 | 25 | 33.3 | 33.3 | 33.3 | 33.3 |
| Liquid rubber | PIB | 13.3 | 13.3 |  |  | 13.3 | 13.3 | 13.3 | 13.3 |
| Filler | Carbon black | 1.3 | 1.3 |  |  | 1.3 | 1.3 | 1.3 | 1.3 |
|  | Talc |  |  | 50 | 50 |  |  |  |  |
| Vulcanizing agent | ZnO |  |  | 3.5 | 3.5 |  |  |  |  |
|  | Zinc stearate |  |  | 1.4 | 1.4 |  |  |  |  |
|  | Stearic acid |  |  | 0.7 | 0.7 |  |  |  |  |
| Age inhibitor |  |  |  | 1.4 | 1.4 |  |  |  |  |
| Tackifier (rosin ester) |  |  |  | 50 | 50 |  |  |  |  |
| Adhesiveness imparting agent (silane coupling agent) |  |  |  | 2 | 2 |  |  |  |  |
| Secondary seal |  | Present | Present | Absent | Present | Present | Present | Present | Absent |

The respective components in Table 1 were as follows.

HDPE: JREX KM890K, manufactured by Mitsui Chemicals, Inc.

LDPE: JREX KM908A, manufactured by Japan Polyolefin

LLDPE: Sumikasen GA802, manufactured by Sumitomo Mitsui Polyolefin Co., Ltd.

Br-IPMS: Exxpro 3433, manufactured by Exxon

EPDM: EPT 3045, manufactured by Mitsui Chemicals, Inc. or Esprene 514, manufactured by Sumitomo Chemical Co., Ltd.

Butyl rubber: Exxon Butyl 365, manufactured by Exxon

Moisture absorbent: Zeolum 3-A, manufactured by Tosoh Corporation

PIB: Oppanol B15, manufactured by BASF

Carbon black: Asahi #60, manufactured by Asahi Carbon

Talc: Mistron Vapor, manufactured by Nihon Mistron Co., Ltd.

Calcium carbonate: heavy calcium carbonate, manufactured by Maruo Calcium Co., Ltd.

ZnO: zinc white No. 3, manufactured by Seido Chemical Industry Co., Ltd.

Zinc stearate: zinc stearate, manufactured by Seido Chemical Industry Co., Ltd.

Stearic acid: stearic acid (beads), manufactured by NOF Corporation

Age inhibitor: Nocceler NS, manufactured by OUCHI SHINKO CHEMICAL INDUSTRIAL CO., LTD.

Tackifier (rosin ester): Pensel AD, manufactured by Arakawa Chemical Industries, Ltd.

Adhesiveness imparting agent (silane coupling agent): A-174, manufactured by Nippon Unicar Co., Ltd.

<Calculation of Moisture Vapor Permeability of Thermoplastic Resin>

The moisture vapor permeability of the thermoplastic resin used in each of Examples and Comparative Examples was calculated according to the method described below.

The thermoplastic resins shown in Table 1 were formed into 1 mm-thick sheets through press molding to prepare samples (sample sheets) to be used for measuring the moisture vapor transmission rate.

Figure 6:
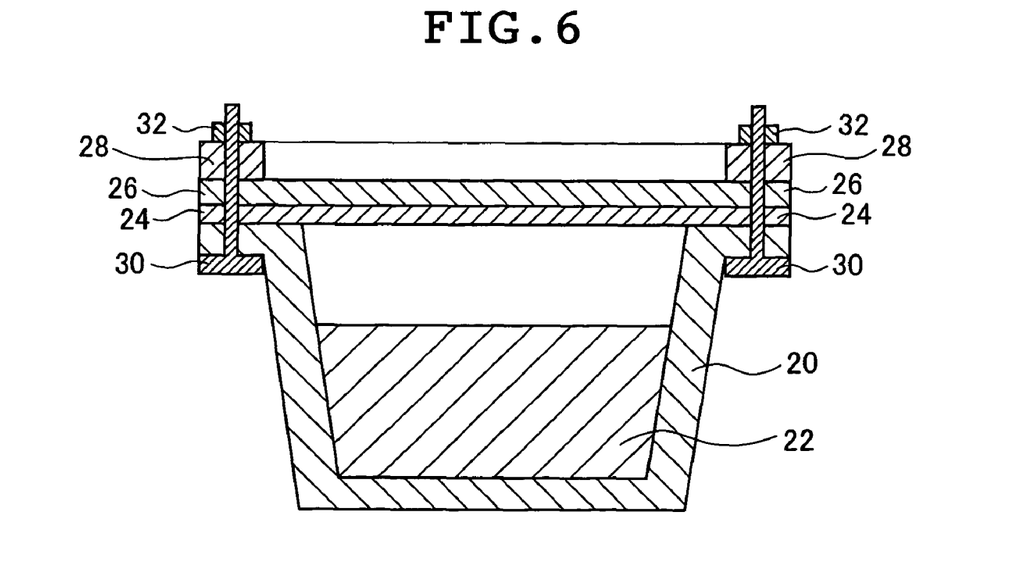
FIG. 6 is a schematic sectional view showing a cup used for measuring the moisture vapor transmission rate in Examples.

FIG. 6 is a sectional view showing a cup used for measuring the moisture vapor transmission rate.

In FIG. 6, reference numeral 20 denotes the cup; 22, water; 24, a sample sheet; 26, a sintered metal plate; 28, a fixing member; 30, a bolt; and 32, a nut.

An amount of water 22 equivalent to one half the volume of the stainless cup 20 shown in FIG. 6 was poured into the cup. An upper opening of the cup 20 was covered with the sample sheet 24 (thickness: 1 mm) obtained by cutting the sample sheet obtained above. The sintered metal plate 26 was placed on the sample sheet. The sheet and the plate were clamped with the bolts 30 and the nuts 32 through the fixing member 28. The cup was left standing in an environment at a temperature of 25° C. for 1 month. After that, the entire weight was measured. A reduction in weight was converted into a value per 24 hours by the following expression to calculate the moisture vapor transmission rate.

$$\text{Moisture vapor transmission rate}[g/24hr \cdot m^2] = M/(T \cdot A)$$

In the expression, A represents a permeation surface area [m$^2$], T represents a testing time [day], and M represents a reduced weight [g].

The moisture vapor permeability was determined from the moisture vapor transmission rate thus determined in accordance with the following expression.

$$\text{Moisture vapor permeability}[cm^3 \cdot cm/(cm^2 \cdot sec \cdot Pa)] = 1.744 \times 10^{-14} \times \text{Moisture vapor transmission rate}[g/(24hr \cdot m^2)] \times \text{Thickness}[mm]$$

The moisture vapor permeability of five sample sheets was measured, and the average value of the five measurements was defined as the moisture vapor permeability.

Table 2 shows the results.

<Calculation of Moisture Vapor Permeability of Thermoplastic Resin Composition>

The moisture vapor permeability of the thermoplastic resin composition used in each of Examples and Comparative Examples was measured in the same manner.

Table 2 shows the results.

The respective insulating glass units obtained above were evaluated for their dew point performance, moldability, workability, retention stability, and productivity. Table 2 shows the results.

<Dew Point Performance>

Insulating glass units were evaluated for their dew point performance according to classes I to III of "Classification of accelerated aging test of sealed glass" set forth in JIS R3209-1998, at an initial stage and under high-temperature and high-humidity conditions.

To be specific, the dew point was measured after the test processes under the respective conditions shown below had been terminated.

Class I: A moisture/light resistance test is performed for 7 days, and 12 cycles of a repetitive test in which cooling and heating are successively repeated are performed.

Class II: Subsequent to the test process of Class I, a moisture/light resistance test is performed for 7 days, and then 12 cycles of a repetitive test in which cooling and heating are successively repeated are performed.

Class III: Subsequent to the test process of Class II, a moisture/light resistance test is performed for 28 days, and then 48 cycles of a repetitive test in which cooling and heating are successively repeated are performed.

Initial stage (measuring timing of the initial expression property): 24 hours after the production of an insulating glass unit.

High-temperature and high-humidity conditions: Left standing in an environment at 55° C. and 95 RH % for 28 days.

The evaluation criteria were as follows: "A" for a dew point of −50° C. or lower, "B" for a dew point higher than −50° C. but equal to or lower than −35° C., "C" for a dew point higher than −35° C. but lower than 0° C., and "D" for a dew point of 0° C. or higher.

<Moldability (Heat Shrinkage)>

Insulating glass units were evaluated for their moldability in terms of the heat shrinkage of the thermoplastic resin compositions.

A composition having high heat shrinkage involves a problem in that the composition applied to two glass plates shrinks to narrow the distance between the two glass plates, whereby an air layer having a desired volume cannot be obtained.

The heat shrinkage was evaluated by measuring a rate of change in dimension according to the method described below.

That is, the heat shrinkage was indicated by a rate of change in dimension with respect to an initial dimension of 300 mm in length when the temperature of a composition applied at 150° C. was lowered from 60° C. to room temperature (20° C.).

The evaluation criteria were as follows: "A" for a rate of change in dimension of 0.8% or less, "B" for a rate of change in dimension of 1.0% or less, "C" for a rate of change in dimension larger than 1.0% but equal to or less than 5.0%, "D" for a rate of change in dimension larger than 5.0% but less than 10%, and "E" for a rate of change in dimension equal to or larger than 10%.

<Workability (Collapse at the Time of Casting)>

The workability was evaluated by the degree to which a composition collapsed at the time of casting of the composition (by the collapse at the time of casting). An evaluation method is shown below.

After a composition had been cast, glass was brought into press contact at room temperature by a 1.5-t load press. The workability was indicated by a rate of change in thickness dimension.

The evaluation criteria were as follows: "A" for a rate of change in dimension of 5% or less, "B" for a rate of change in dimension larger than 5% but equal to or less than 10%, "C" for a rate of change in dimension larger than 10% but equal to or less than 15%, and "D" for a rate of change in dimension larger than 15%.

<Retention Stability>

The retention stability was judged according to the state of each of the thermoplastic resin compositions in a heated and molten state at the time of application to a glass plate. Since the viscosity of each of the vulcanizing agent-containing compositions in Comparative Examples 3 and 4 may be found to be increased in a heated and molten state, the retention stability was judged based on a change in viscosity in the heated and molten state.

The evaluation criteria were as follows: "low" for the case where an increase in viscosity was observed and "high" for the case where no increase in viscosity was observed.

<Productivity>

The results obtained by comparing the productivity between the inventive insulating glass units and a conventional insulating glass unit and the evaluation results of the retention stability were considered in a comprehensive manner to determine the productivity of the insulating glass units.

The evaluation was relatively made based on the productivity of the conventional insulating glass unit that was regarded as low. The productivity was evaluated by three levels of "very high", "high" and "medium" in order of decreasing productivity.

TABLE 3

Table 2 (Part 1)

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Moisture vapor permeability of thermoplastic resin cm³·cm/(cm²·sec·Pa) | | $4.0 \times 10^{-16}$ | $5.0 \times 10^{-15}$ | $3.0 \times 10^{-14}$ | $5.0 \times 10^{-15}$ | $5.0 \times 10^{-15}$ | $4.0 \times 10^{-16}$ | $5.0 \times 10^{-15}$ | $5.0 \times 10^{-15}$ | $5.0 \times 10^{-15}$ | $5.0 \times 10^{-15}$ |
| Moisture vapor permeability of thermoplastic resin composition cm³·cm/(cm²·sec·Pa) | | $6.0 \times 10^{-16}$ | $7.0 \times 10^{-15}$ | $5.0 \times 10^{-14}$ | $7.0 \times 10^{-15}$ | $8.0 \times 10^{-15}$ | $6.0 \times 10^{-16}$ | $8.0 \times 10^{-15}$ | $8.0 \times 10^{-15}$ | $7.0 \times 10^{-15}$ | $8.0 \times 10^{-15}$ |
| Dew point performance | Initial stage | C | B | A | B | B | C | B | B | B | B |
| | Class I | A | A | A | A | A | A | A | A | A | A |
| | Class II | A | A | A | A | A | A | A | A | A | A |
| | Class III | A | A | A | A | A | B | A | A | A | A |
| | High-temperature and high-humidity conditions | A | A | A | A | A | A | A | A | A | A |
| Moldability | | D | C | C | C | B | D | B | A | A | B |
| Workability | | A | B | B | B | A | A | A | A | A | A |
| Retention stability | | high | high | high | high | high | high | high | high | high | high |
| Productivity | | very high | very high | very high | very high | very high | very high | very high | very high | very high | very high |
| Secondary seal | | Present | Present | Present | Present | Present | Absent | Present | Present | Present | Present |

TABLE 4

Table 2 (Part 2)

|  |  | CEx. 1 | CEx. 2 | CEx. 3 | CEx. 4 | CEx. 5 | CEx. 6 | CEx. 7 | CEx. 8 |
|---|---|---|---|---|---|---|---|---|---|
| Moisture vapor permeability of thermoplastic resin cm³·cm/(cm²·sec·Pa) | | $4.0 \times 10^{-16}$ | $4.0 \times 10^{-16}$ | $4.0 \times 10^{-16}$ | $4.0 \times 10^{-16}$ | $4.0 \times 10^{-16}$ | $5.0 \times 10^{-15}$ | $3.0 \times 10^{-14}$ | $4.0 \times 10^{-16}$ |
| Moisture vapor permeability of thermoplastic resin composition cm³·cm/(cm²·sec·Pa) | | $5.0 \times 10^{-16}$ | $9.0 \times 10^{-16}$ | $8.0 \times 10^{-16}$ | $8.0 \times 10^{-16}$ | $6.0 \times 10^{-16}$ | $7.0 \times 10^{-15}$ | $5.0 \times 10^{-14}$ | $6.0 \times 10^{-16}$ |
| Dew point performance | Initial stage | C | C | C | C | C | B | A | C |
| | Class I | A | A | A | A | A | A | A | C |
| | Class II | B | B | A | A | B | C | C | D |
| | Class III | C | C | A | A | C | C | C | D |
| | High-temperature and high-humidity conditions | D | D | C | A | D | D | D | D |
| Moldability | | E | C | D | D | D | C | C | D |
| Workability | | A | D | A | A | C | C | C | C |
| Retention stability | | high | high | low | low | high | high | high | high |
| Productivity | | very high | very high | high | medium | high | high | high | high |
| Secondary seal | | Present | Present | Absent | Present | Present | Present | Present | Absent |

As shown in Table 2, each of the insulating glass units in Examples 1 to 10 that used the thermoplastic resin composition of the present invention was excellent in heat shrinkage, moldability, and dew point performance, and was capable of improving productivity.

In addition, each of the insulating glass units in Examples 2 to 5 that used the composition of the present invention in which the thermoplastic resin selected was LDPE or LLDPE was more excellent in initial expression property in dew point performance and moldability.

In addition, each of the insulating glass units in Examples 5 and 7 to 9 that used the composition of the present invention to which a specific amount of talc was added was more excellent in moldability. The insulating glass unit in Example 10 that used the composition of the present invention to which a specific amount of calcium carbonate was added was also excellent in moldability. In addition, the composition of the present invention used for each of the insulating glass units in Examples 5 and 7 to 10 maintained its discharge property (fluidity).

The insulating glass unit that used the thermoplastic resin composition containing no unvulcanized rubber (Comparative Example 1) could not satisfy the dew point performance and was poor in moldability. The insulating glass unit that used the thermoplastic resin composition in which the weight ratio of the thermoplastic resin to the unvulcanized rubber did not fall within the range of the present invention (Comparative Example 2) was poor in dew point performance (Class II and Class III) and workability.

Furthermore, each of the insulating glass units that used the thermoplastic resin composition in which a vulcanized rubber is dispersed (Comparative Examples 3 and 4) had a problem of retention stability and was also poor in moldability.

In addition, each of the insulating glass units that used the thermoplastic resin composition in which the unvulcanized rubber selected was butyl rubber (Comparative Examples 5 to 8) was inferior in heat resistance.

The invention claimed is:

1. An insulating glass unit comprising:
   two glass plates opposed to each other; and
   a spacer arranged between the two glass plates, said spacer being made of a thermoplastic resin composition comprising:
   a thermoplastic resin (A) having a moisture vapor permeability of $1.0 \times 10^{-13}$ cm$^3$·cm/(cm$^2$·sec·Pa) or lower, said thermoplastic resin (A) being at least one selected from the group consisting of a low density polyethylene (LDPE) and a linear low density polyethylene (LLDPE);
   at least one unvulcanized rubber (B) selected from the group consisting of a halogenated isoolefin/paraalkyl-styrene copolymer and an ethylene propylene rubber;
   a moisture absorbent (C); and
   at least one additive selected from the group consisting of a barrier resin, a liquid rubber, an inorganic filler, a tackifier, an age inhibitor, a heat stabilizer, an antioxidant, a softening agent, a processing aid, an inorganic pigment, and an organic pigment,
   wherein the weight ratio of the thermoplastic resin (A) to the unvulcanized rubber (B) is 85/15 to 15/85;
   the content of the moisture absorbent (C) is 10 to 70 parts by weight to 100 parts by weight of the total of the thermoplastic resin (A) and the unvulcanized rubber (B); and the unvulcanized rubber (B) of the spacer is not vulcanized, and
   wherein an air layer is formed by the two glass plates and the spacer of the unit.

2. The insulating glass unit of claim 1, wherein the spacer also serves as a sealant and adhesive layers are arranged between the spacer and the two glass plates.

3. The insulating glass unit of claim 1, further comprising a secondary seal.

4. The insulating glass unit of claim 1, wherein the spacer maintains a distance between the two glass plates at a predetermined value and also serves to seal the air layer from outside air.

5. The insulating glass unit of claim 2, wherein the spacer maintains a distance between the two glass plates at a predetermined value and also serves to seal the air layer from outside air.

6. The insulating glass unit of claim 5, wherein a gap formed by an outer peripheral surface of the spacer, the adhesive layers, and inner surfaces of peripheral portions of the two glass plates is sealed with a secondary sealant.

7. A method for making the insulating glass plate unit of claim 1 comprising the steps of:
   pelletizing to a pellet the thermoplastic resin composition;
   molding the pelletized pellet into a spacer for an insulating glass unit; and
   arranging the spacer near peripheral portions of inner surfaces of the two glass plates opposed to each other so that the air layer is formed by the two glass plates and the spacer.

8. The method for making the insulating glass plate unit of claim 7, wherein adhesive layers are arranged between the inner surfaces of the peripheral portions of each glass plate and the spacer.

* * * * *